May 20, 1969   R. ZITTER   3,445,157
HAND-OPERATED DISTORTING TOY MIRROR
Filed Sept. 17, 1965   Sheet 2 of 2
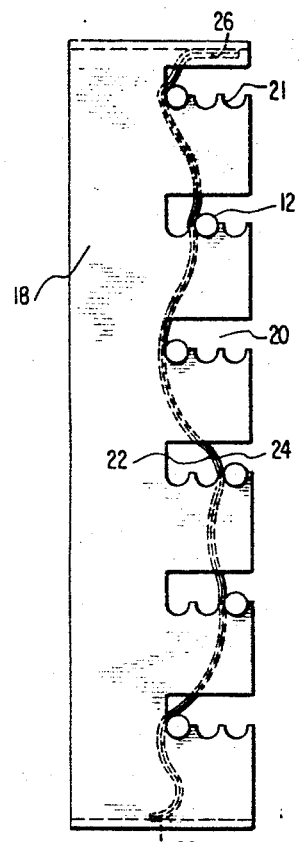
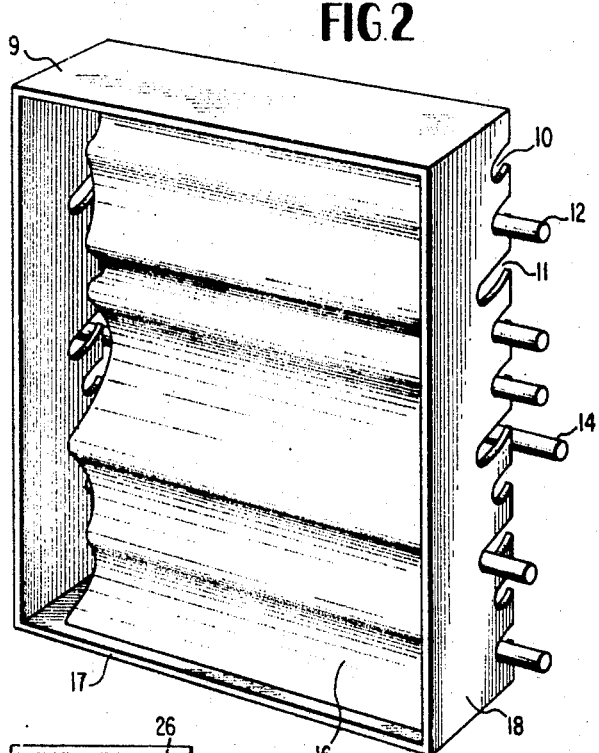
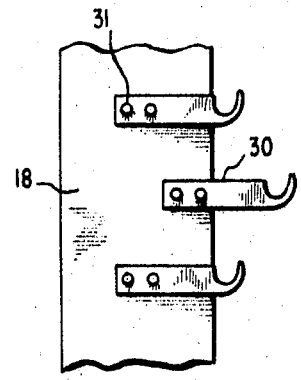
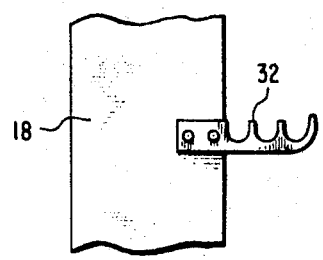
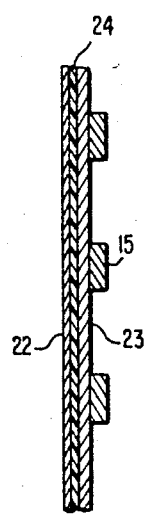
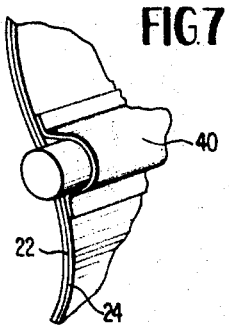
INVENTOR
ROBERT ZITTER
BY
Abraham A. Saffitz
ATTORNEY United States Patent Office 3,445,157
Patented May 20, 1969

3,445,157
HAND-OPERATED DISTORTING TOY MIRROR
Robert Zitter, New York, N.Y., assignor to
Science for Fun, Inc.
Filed Sept. 17, 1965, Ser. No. 488,152
Int. Cl. A63j 23/00
U.S. Cl. 350—295                              1 Claim

ABSTRACT OF THE DISCLOSURE

An amusement device which provides a distorted image comprising a flexible reflective sheet, a pair of rigid elongated supporting elements secured at the upper and lower edges of the sheet, a frame having slots at the sides, the slots accommodating the elements to adjust the effective length of the flexible mirror, and handle means projecting from the ends of the elongated elements which can be twisted to increase or decrease the degree of curvature of the flexible sheet. This device is simple enough to be used by a young child and can provide amusement for adults who can be made to appear fat or thin, tall or short at the whim of the individual twisting the handles.

---

This invention relates to an amusement mirror which is adapted to be deflected or distorted from a planar condition into any of a plurality of configurations for the purpose of distorting the actual image of a person or object for providing amusement.

The mirror of this invention is of the general type usually found in amusement parks which reflects an image of a person wherein, for example, the person appears unusually fat or thin or unusually tall or short. The particular reflected image depends upon the particular curvature of the mirror or portions thereof, whether it be generally convex, concave, planar or otherwise. Currently mirrors of this general type, however, are unadjustable and of a rigid construction providing the same type of view. The mirror of this invention is flexible, permitting a multiplicity of possible views with merely a simple adjustment. The mirror construction is such that it is ideally suited for manufacture in a scaled down version for use as a toy for children.

It is therefore an object of this invention to provide an amusement mirror of a flexible construction which is adapted to be bent into any one of a plurality of configurations permitting numerous unusual and humorous images to be reflected therefrom.

It is a further object to provide a flexible amusement mirror incorporating adjustment means of a simple nature permitting quick and easy manipulation by a child.

It is a further object to provide a flexible amusement mirror of a simple construction which may be manufactured inexpensively as a toy for children.

Other objects and advantages of the present invention will become apparent from the following description which taken in conjunction with the drawings wherein:

FIG. 2 is a perspective view of another embodiment of the present invention showing a modified type of support means for the mirror;

FIG. 3 is a vertical end view of the present invention showing another modified type of support means for the mirror;

FIG. 4 is a partial end view showing another form of support means for the mirror;

FIG. 5 is a partial end view similar to FIG. 4 showing a modification of the support means of FIG. 4;

FIG. 6 is a partial end view of the mirror showing a modified type of rib structure; and FIG. 7 is a cross section of another embodiment of the invention employing a flexible plastic sheet mirror which is stiffened by cross rods inserted into and free to rotate within bonded sleeve members.

Figure 1:
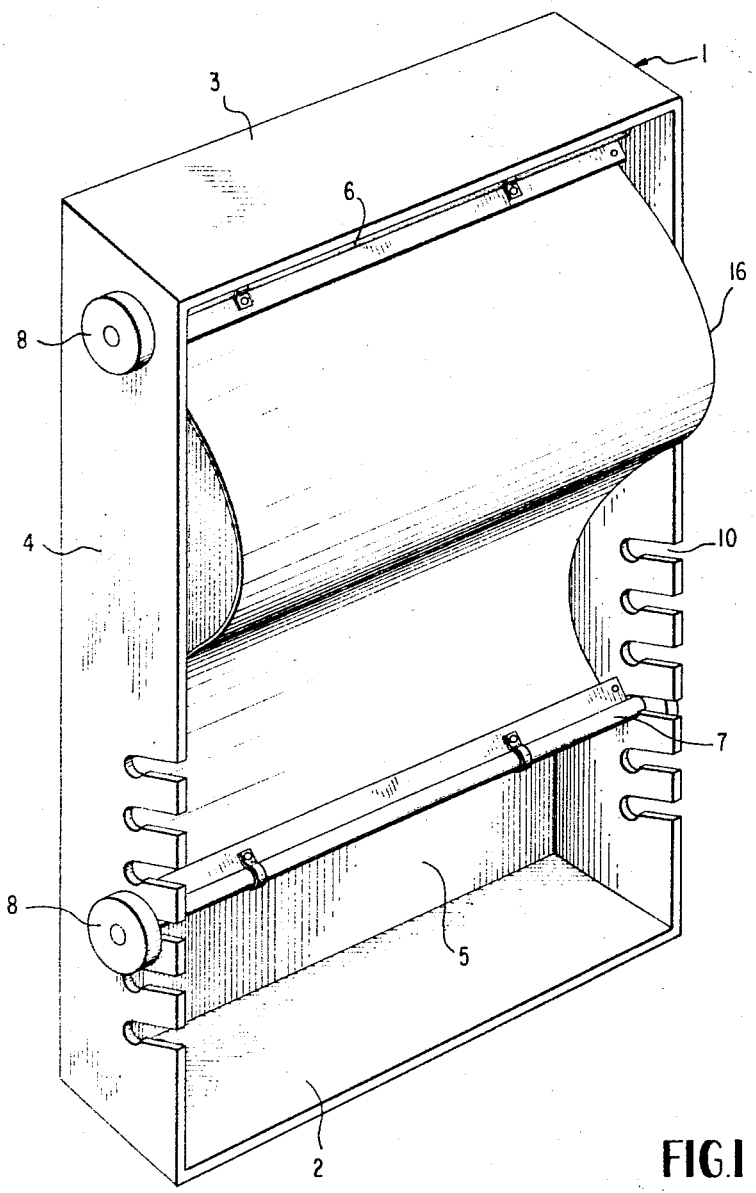
FIG. 1 is a perspective view of one embodiment of the present invention.

As seen in FIG. 1, one embodiment of the present invention comprises a frame 1 of a four-sided configuration having a bottom panel 2 which serves as a support, a top panel 3 and a pair of side panels 4, the side panels 4 having a plurality of slots 10 formed in the front edges thereof. The rear of the frame is provided with a back panel 5 and the front of the frame is open to permit viewing of a mirror 16. The mirror 16 is provided with a pair of transversely extending ribs 6 and 7 secured respectively to the upper and lower edges thereof. Rib 6 is mounted between the side panels 4 and rib 7 is designed to be positioned in any of the slots 10 in both of the side panels 4. The slots are inclined downwardly in order to prevent dislodgement of rib 7 therefrom. Ribs 6 and 7 have secured to their ends knobs 8 adapted to be rotated about the longitudinal axis of the ribs in order to change the curvature of the mirror.

The rotation of ribs 6 and 7 is accompanied by sufficient friction so that they maintain position and do note rotate unless force is applied to the knobs 8. Such friction is supplied either through tight bearings or fittings for the rib 6 and in the slots 10 for the rib 7, or through pads of felt, rubber or other material of high friction properties resting between the knobs 8 and side panels 4. Alternatively, friction between the materials of the knobs 8 and the panels 4 may be used for the aforementioned purpose.

The slots 10 are preferably equally spaced and horizontally opposed so that the rib 7 may be placed in selected opposed pairs of the slots. However, the slots 10 may be formed in any desired pattern in each of the side panels, and the patterns of each of the side panels may differ so that possibly none of the slots in the side panels are horizontally opposed.

The mirror consists of a backing layer 24 of a suitable flexible plastic material of a relatively thin gauge to enhance the flexibility thereof, and a front layer 22 of a suitable reflective material such as aluminum, chromium, silver or nickel. The reflective layer may be applied by any conventional process, such as spraying or laminating coating methods.

The selection of the plastic layer 24 is based upon factors of economy, optical properties and physical properties. It is preferred to employ flexible acrylic resin (Lucite or Perspex) or cellulose acetate or cellulose propionate or high impact copolymer of styrene and acrylonitrile. An opaque backing of paper 23 is provided behind the plastic layer by gluing or bonding to the plastic, as seen in FIG. 6.

A modified embodiment of the present invention as seen in FIG. 2 comprises a frame 9 of a rectangular configuration having a bottom panel 17 which serves as a support, a top panel, and a pair of side panels 18 having a plurality of slots 10 formed in the rear edges thereof. The front and rear of the frame are preferably open but the rear may be provided with a back panel (not shown) in order to give rigidity to the device and provide protection for the mirror 16.

In FIG. 2, the mirror 16 is provided with a plurality of spaced traversely extending ribs 12 of circular section secured to the backing layer 24 of the mirror 16 by any suitable method such as by utilizing an adhesive, or they may be fused thereon under a heated environment if thermoplastic materials are employed for either or both of the backing layer or rib. It is also possible to form the ribs integral with the backing layer using conventional molding techniques. If the frame is provided with a back panel, a vertically extending slot(s) or space(s) should be provided between the rear edge of the side panels 18 and the back panel in order to permit vertical repositioning of the ribs 12 from one slot to another, as desired.

The ribs, 6, 7 and 12, may be of any suitable material, such as plastic, metal or wood, for example, but the material chosen should be relatively rigid in relation to the mirror in order to prevent flexure of the mirror along the lengths thereof. The ribs 12 are shown to be of a rounded shape in FIGS. 2 and 3, but they may be square, rectangular as seen in FIG. 6, or any other desired configuration.

The rectangular cross section ribs 15, seen in FIG. 6, provide a stiffer reinforcement than the circular cross section ribs 12 which are shown in FIG. 2. Therefore, the FIG. 6 modification is adapted to be utilized in conjunction with side panels having slots which are modified to accept the rectangular shape of the ribs.

In the embodiments shown in FIGS. 2, 3 and 6, the ribs are preferably equally spaced one from another in a transversely extending parallel array. As seen in FIG. 2, the number of slots 10 in each of the side panels exceeds the number of ribs; but the number of slots in each side panel may be equal to the number of ribs, as seen in FIG. 3, or alternatively, the number of ribs may exceed the number of slots in each side panel. The ribs may also be spaced at unequal distances one from another in a generally parallel array even in the situation mentioned above, wherein the slots are not equally spaced and horizontally opposed in each of the side panels.

In FIG. 3, the top portion 26 of the mirror 16 is preferably secured to the under surface at the top panel of the frame by suitable means such as an adhesive, staples or the like, and is free at the bottom portion 28 thereof; but it may be secured at both the top and bottom. Alternatively, it may be secured at neither the top nor the bottom, but may be supported solely by the ribs 12.

The slots 10 in FIG. 2 are inclined downwardly in order to prevent dislodgement of the ribs therefrom and are formed such that some are of longer extent than others, such as slot 11, for example. The purpose of this is to make possible differing flexures or contours in portions of the mirror in order to give different reflective characteristics to those portions. However, it is also possible to make all the slots of the same length as in FIG. 1.

A modified form of slot 20 is shown in FIG. 3. This type of slot is provided with a plurality of notches 21 so that the ribs may be placed in any desired notch. Although all of the slots 20 are shown with three notches, any number of notches may be provided and the number of notches in each slot may differ from an adjacent slot.

In lieu of slots, the ribs may be supported by brackets 30, as seen in FIG. 4. The brackets are secured to the side panels 18 in any desired manner, such as by fastening means generally indicated by numeral 31. The brackets 30 may be of different lengths or, as shown in FIG. 4, may be staggered so that the notches thereof are not vertically aligned. It is, of course, possible to contruct and/or position the brackets so that all the notches are vertically aligned, but there would be limited capacity in such a design for securing various flexures of the mirror.

The brackets may also be of the plural notch type as indicated by numeral 32 in FIG. 5. The remarks made above, relative to slots 10 and 20, regarding length, spacing, positioning, number, etc., also apply to the brackets 30 and 32.

FIG. 6 shows a partial end view of a mirror in accordance with the invention wherein a rib 15 of rectangular cross section is employed instead of the circular section ribs 12 and 14 shown in FIG. 2. In this FIG. 6 embodiment, the transparent plastic backing 24 is coated on its front surface with a metal reflective coating 22, and a paper covering 23 serves to protect the outside of the rear of the mirror. This is an alternate construction which permits the support of a very thin metallized plastic sheet.

FIG. 7 shows a cross section of another embodiment of the invention employing a flexible plastic sheet mirror (reflective coating 22 on support 24) which is stiffened by cross rods inserted into and free to rotate within bonded sleeve members 40. The sleeve member is made of stiff paper, but it may be of plastic material or of stiff aluminum foil.

In use, all or some of the ribs are placed in the desired slots or brackets and also in the desired notch, if more than one notch is provided. In so doing, the mirror is given a particular contour which possesses particular reflective characteristics. If it is desired to change the appearance of a reflective image, the ribs may be rotated by knobs 8, as shown in FIG. 1, or rearranged into different slots, brackets or notches if a plurality are provided. For example, it is possible to remove one rib from a particular slot or bracket and position it in one above or below said slot, or in the embodiment shown in FIGS. 2 and 3, to remove it completely into a position such as indicated by the rib 14 of FIG. 2, where it may abut the rear edges of the side panels or else hang freely. The mirror is constructed of a sufficient length so that there is enough slack to permit the manipulations desired.

The foregoing illustrates a low cost toy mirror formed of a flexible plastic sheet which is provided with a reflective coating and is reinforced with at least one rib to distort the mirror in a great variety of curved tensioned positions thereby facilitating its use as an amusement device.

The reflecting coating applied to the plastic support comprising the mirror element may vary widely; metals such as nickel, zinc, silver, gold, platinum, iridium and aluminum and its alloys may be applied by vapor deposition methods under vacuum to achieve attractive color effects. Speculum metal solutions of liquid bright gold, silver or platinum may be used. Electrolytically deposited coatings may be applied to give coatings which are partly reflective and partly transparent. Reflection factors, e.g. percent reflecting power, may vary from 50 to 90%, depending upon whether the reflective coating has been polished.

An opaque inexpensive asphalt coating may be used to seal the reflective layer. The purpose of this opaque asphalt is to protect the brittle thin coating of metal from mechanical dislodgment.

What is claimed is:
1. An amusement device for providing distorted images comprising: a flexible sheet having a forward facing reflective surface; a pair of relatively rigid elongated elements transversely secured to the upper and lower edges of said sheet to support said sheet at various lengths between said edges; a substantially rectangular four-sided frame having a pair of openings in opposite sides near one end cooperating with one of said elongated elements and a plurality of pairs of downwardly inclined spaced apart slots in opposite sides near the other end of the frame cooperating with another of said elongated elements for adjusting the effective length and retaining therein said flexible sheet; and a handle member secured on the ends of said elongated elements projecting from said frame for rotating said elongated elements about their longitudinal axis to increase or decrease the degree of curvature by twisting said handle member whereby a distorted image is provided.

References Cited

UNITED STATES PATENTS

| | | | |
|---|---|---|---|
| 753,351 | 3/1904 | Beidler | 350—295 X |
| 884,217 | 4/1908 | Schuessler | 350—295 |

FOREIGN PATENTS 473,382  10/1937  Great Britain.

DAVID SCHONBERG, *Primary Examiner.*

J. W. LEONARD, *Assistant Examiner.*

U.S. Cl. X.R.

272—8